United States Patent [19]

Nakadate et al.

[11] Patent Number: 4,550,236
[45] Date of Patent: Oct. 29, 1985

[54] GUN ARM APPARATUS FOR RESISTANCE WELDING GUN

[75] Inventors: Toshihiko Nakadate, Sayama; Morikuni Numata, Ageo, both of Japan

[73] Assignee: Honda Giken Kogyo Kabushiki Kaisha, Shibuya, Japan

[21] Appl. No.: 564,530

[22] Filed: Dec. 22, 1983

[30] Foreign Application Priority Data

Dec. 27, 1982 [JP] Japan ............................ 57-195609[U]
Jan. 12, 1983 [JP] Japan ............................... 58-1727[U]
Jan. 14, 1983 [JP] Japan ............................... 58-2736[U]

[51] Int. Cl.4 ............................................ B23K 11/28
[52] U.S. Cl. ................... 219/86.31; 219/86.21; 219/86.25
[58] Field of Search ............... 219/119, 120, 86.25, 219/86.21, 86.31, 137.9; 901/42; 174/15 WF, 15 C

[56] References Cited

U.S. PATENT DOCUMENTS 2,249,937  7/1941  Bohn .................................. 219/120
3,043,901  7/1962  Gerwing et al. ................. 174/15 WF
3,523,172  8/1970  Wilbur .................................. 219/89

FOREIGN PATENT DOCUMENTS 2233372  2/1973  Fed. Rep. of Germany ...... 219/119
WO80/229  2/1980  PCT Int'l Appl. ............... 219/86.31

Primary Examiner—Roy N. Envall, Jr.
Assistant Examiner—Catherine M. Sigda
Attorney, Agent, or Firm—Armstrong, Nikaido, Marmelstein & Kubovcik

[57] ABSTRACT

The present invention is directed to a gun arm apparatus for a resistance welding gun. The gun arm apparatus comprises a main body having a U-shaped cross-section with an opening formed between the legs of the U. The main body is formed from a relatively thin metal and the main body includes an electrode holder at one end thereof, a support at the other end thereof and an electrical terminal at the other end thereof. An electrical conductor member is fixedly mounted in the opening between the legs of the U-shaped main body. The electrical conductor member is formed from a relatively thick plate member. The conductor connects the electrode holder to the electrical terminal. A cooling water passage is positioned in contact with the conductor for carrying cooling water to cool the electrical conductor member. In one embodiment, the cooling water passage comprises at least one pipe fixedly attached to the conductor and in another embodiment, the cooling passage comprises grooves formed in the conductor.

7 Claims, 11 Drawing Figures

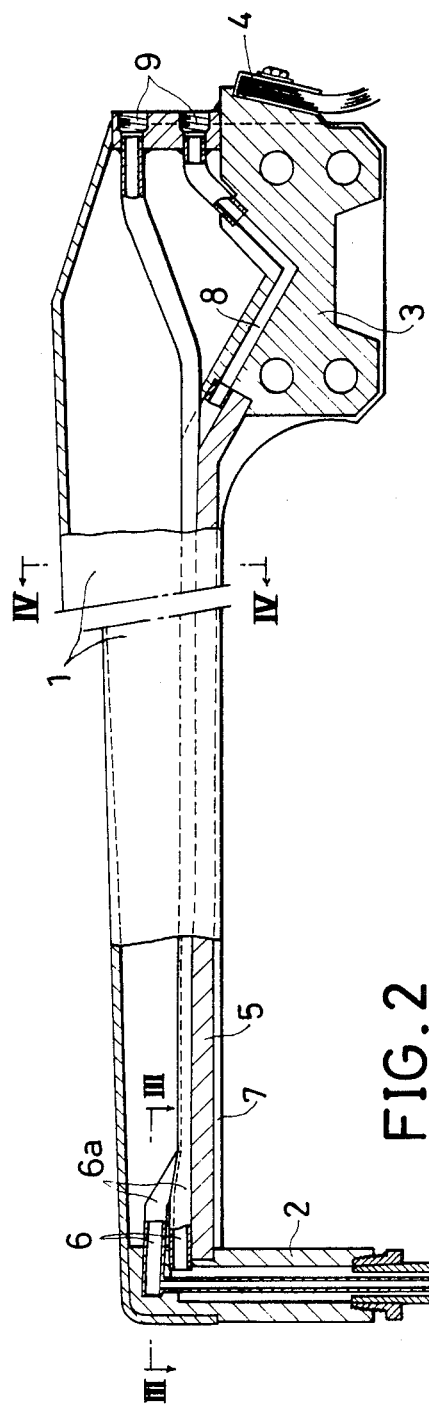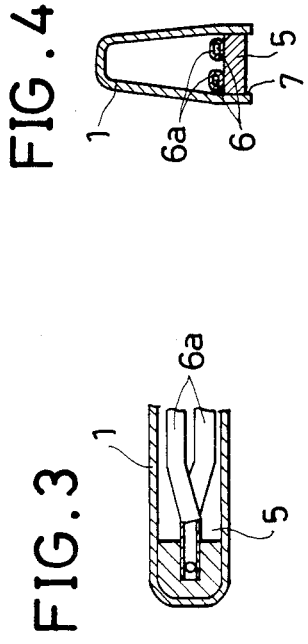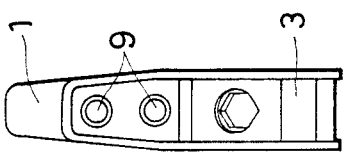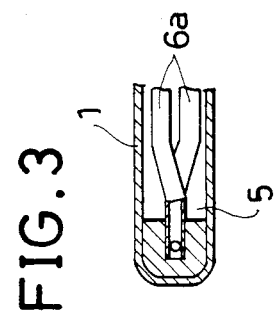

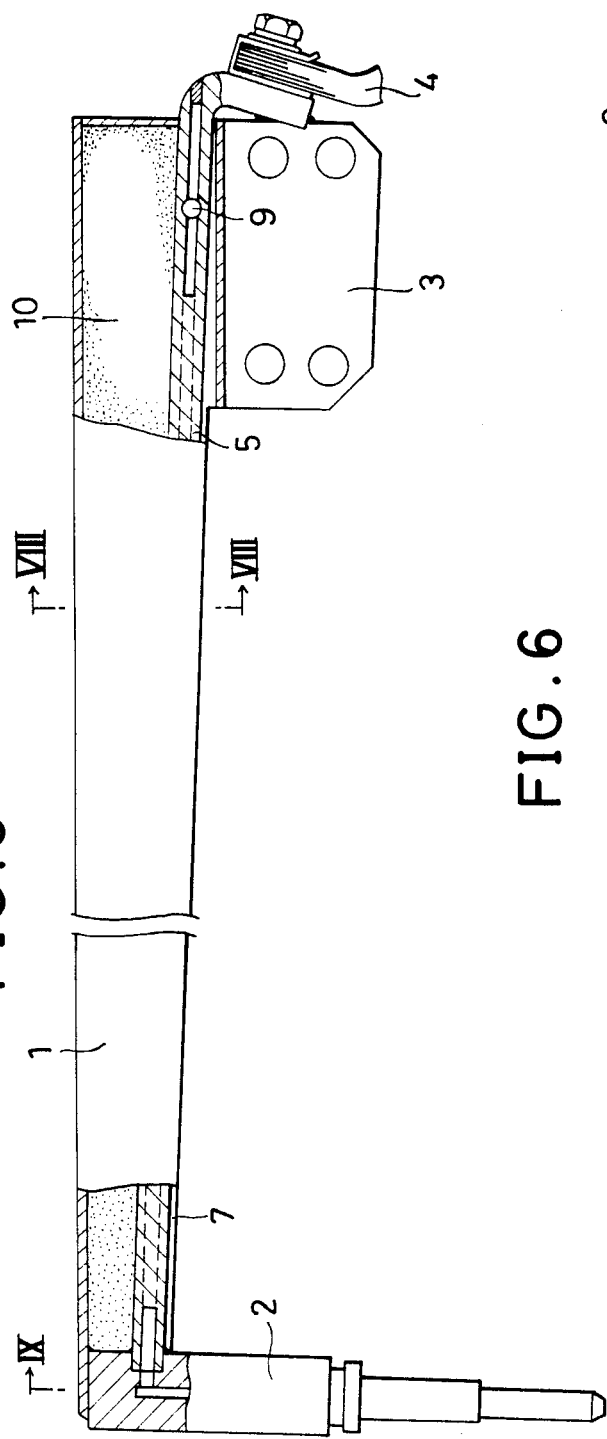
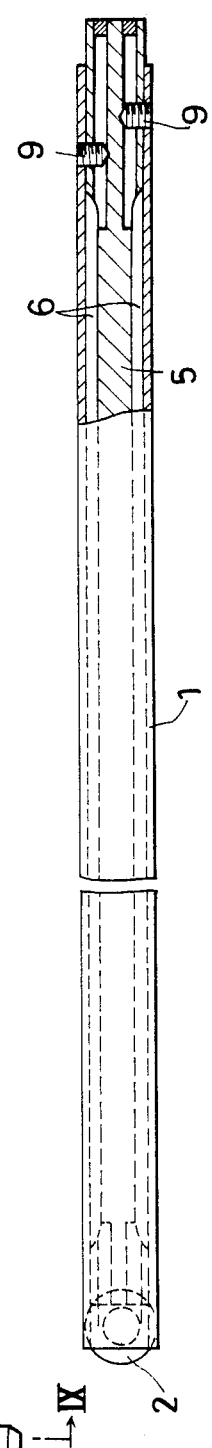
FIG. 5
FIG. 6

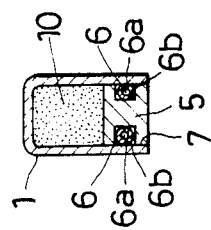
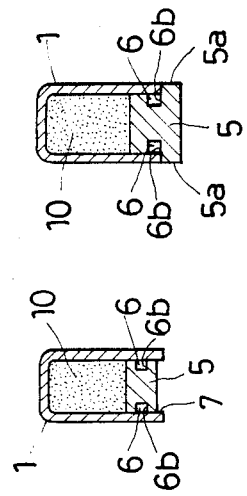
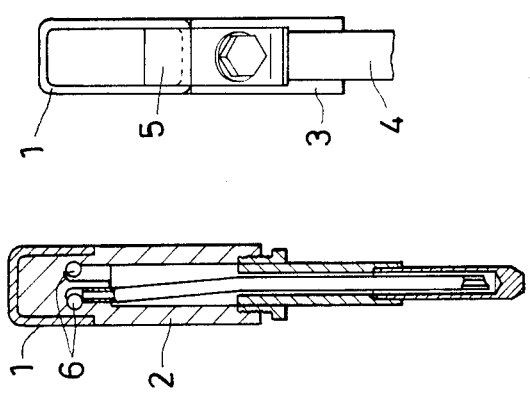

GUN ARM APPARATUS FOR RESISTANCE WELDING GUN

BACKGROUND OF THE INVENTION

1. Field of the Invention

The present invention relates to a gun arm apparatus primarily for use with a portable type resistance welding gun.

2. Description of the Prior Art

One type of prior art gun arm apparatus for a portable resistance welding gun comprises a gun arm main body having at its front end portion an electrode holder and at its rear end portion, a supporting member. A conductor connects the electrode holder to a secondary conductor terminal provided at the rear of the arm. A water passage means is provided for cooling the arm.

Additionally, there has been known with this type apparatus an arrangement such as that shown in Japanese Utility Model Application Publication No. Sho 57-24455. In this apparatus, the main body is formed of a tubular body made of a plate member of comparatively small thickness, and the conductor is formed of copper pipe, which is provided in the main body, and is also used for the water passage means. This arrangement, however, is inconvenient in that it is difficult to provide sufficient strength to the main body and it is difficult to make the conductor with a sufficient electric current capacity.

SUMMARY OF THE INVENTION

It is the object of the present invention to provide a portable type resistance welding gun which has a welding arm, has relatively high mechanical strength and which has a conductor with a relatively high electric current capacity and which has cooling means for cooling the welding arm.

The present invention is directed to a gun arm apparatus for a resistance welding gun. The gun arm apparatus comprises a main body means having a U-shaped cross-section with an opening formed between the legs of the U. The main body means is formed from a relatively thin metal and the main body means includes an electrode holder at one end thereof, a support at the other end thereof and an electrical terminal at the other end thereof. An electrical conductor means is fixedly mounted in the opening between the legs of the U-shaped main body means. The electrical conductor means is formed from a relatively thick plate member. The conductor means connects the electrode holder to the electrical terminal. A cooling water passage means is positioned in contact with the conductor means for carrying cooling water to cool the electrical conductor means. In one embodiment, the cooling water passage means comprises at least one pipe fixedly attached to the conductor means and in another embodiment, the cooling passage means comprises grooves formed in the conductor means.

BRIEF DESCRIPTION OF THE DRAWINGS

FIG. 1 is a side view, partly in section, of one embodiment of the present invention.

FIG. 2 is a rear side view thereof.

FIGS. 3 and 4 are sectional views taken along the lines III—III and IV—IV in FIG. 2.

FIG. 5 is a side view, partly in section, of another embodiment of the present invention.

FIG. 6 is a top plan view thereof.

FIG. 7 is a rear side view of the same.

FIGS. 8 and 9 are sectional views taken along the lines VIII—VIII and IX—IX in FIG. 5.

FIGS. 10 and 11 are sectional views showing modified embodiments thereof.

DETAILED DESCRIPTION OF THE PREFERRED EMBODIMENTS

Referring to FIGS. 1 to 4 showing one embodiment of the present invention, a gun arm main body 1 has at its front end portion an electrode holder 2 and at its rear end portion a supporting member 3. The main body 1 is provided with an electrical conductor 5 for connecting the holder 2 and a secondary conductor terminal 4 located at the rear of the arm. Additionally, the gun arm includes a water passage means 6 for cooling, which comprises a pair of inlet and outlet passages 6a, 6a.

As shown clearly in FIG. 4, the main body 1 is formed with a frame body of a nearly U-shape in cross-section. An opening 7 in one side surface thereof is formed by bending a plate member of comparatively small thickness, and the conductor 5, which is a copper alloy plate-like member of comparatively large thickness, is mounted in the opening 7 and is fixed, by soldering or the like, to the main body 1. The conductor 5 and the water passage means 6 are in contact or integrally formed. In this embodiment, each passage 6a of the water passage means 6 is formed of a copper alloy pipe, and this pipe 6a is fixedly mounted on the conductor 5 by soldering or the like to integrally form these elements. The plate member of the main body 1 is generally made of a magnetic substance such as a carbon steel or the like.

The supporting member 3 is fixedly provided in a portion of the opening 7 that is located at a rear end portion of the main body 1. The conductor 5 is mounted in and fixed by soldering to the supporting member 3 so that the rear end portion of the main body 1, to which a large bending moment is applied at the time of operation, may be strengthened. Additionally, the supporting member 3 is made of a copper alloy and the conductor 5 is electrically connected to the secondary conductor terminal 4 through the supporting member 3. A water passage opening 8 through the supporting member 3 is connected to the copper pipe 6a on one side so that a good cooling action may be provided for the supporting member 3 which is subjected to generation of heat caused by electric current flow therethrough.

The pipes 6a, 6a are connected to respective inlet and outlet openings 9, 9.

Referring to FIGS. 5-9 showing another embodiment of the present invention, U-shaped conduit openings or grooves 6b, 6b, which comprise the water passage means 6, are formed in the conductor 5. Additionally, a space enclosed by the conductor 5 and the main body 1 is filled with a hard foaming material 10 such as foaming urethane, foaming styrol or the like so that the main body 1 may be further increased in strength.

The conductor 5 may be modified, as shown in FIG. 10, with a part 5a formed into an enlarged flanged portion projecting outwards. In addition, the passage means 6 may be as shown in FIG. 11, wherein each U-shaped conduit opening 6b contains a water pipe 6a passing therethrough.

Thus, according to this invention, the conductor is formed of a copper alloy plate-like member of comparatively large thickness having a water passage means combined therewith, with the conductor having a comparatively large electric current capacity. Additionally, the conductor is fixedly mounted in the opening in one side surface of the frame body of the gun arm main body so that the conductor can also function as a reinforcement member for the frame body and thereby provide a comparatively high strength to the main body.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. In a portable type resistance welder having two electrodes a gun arm apparatus extending to one of the two electrodes of the welder to carry a conductor of current to one of said electrodes and to carry a cooling medium for said conductor, which comprises:
   (a) a main body means formed in a U-shaped cross section of relatively thin metal, having sides and an opening between the ends of the sides,
   (b) an electrical conductor means disposed between the sides of the U near the ends of the sides in the form of a relatively thick plate member affixed to said body means along its longitudinal extent, and
   (c) a cooling water passage means in contact with said electrical conductor and carrying cooling water to cool said electrical conductor and electrode.

2. An apparatus as set forth in claim 1, wherein said electrical conductor means is composed of a copper alloy.

3. An apparatus as set forth in claim 1, wherein said cooling water passage means comprises at least one pipe fixedly attached to said electrical conductor means.

4. An apparatus as set forth in claim 1, wherein said electrical conductor means includes at least one groove formed therein and wherein said at least one pipe is positioned in said at least one groove.

5. An apparatus as set forth in claim 1, wherein said water passage means comprises at least one groove formed in said electrical conductor means.

6. An apparatus as set forth in claim 1 wherein said electrical conductor means includes a flange portion extending beyond the open ends of the sides of said U-shaped main body means, and said flange portion contacting the open ends of said sides.

7. An apparatus as set forth in claim 1, wherein a rigid foam is located within said U-shaped main body means.

* * * * *